United States Patent [19]
Kobsa et al.

[11] Patent Number: 5,529,813
[45] Date of Patent: Jun. 25, 1996

[54] PROCESS FOR MICROSTRUCTURING SURFACES OF ORIENTED POLYMERIC SUBSTRATES USING LASER RADIATION

[75] Inventors: Henry Kobsa, Wilmington, Del.; Hermann Bucher, Aachen; Eckehard Onkels, Einhausen, both of Germany

[73] Assignee: E. I. Du Pont de Nemours and Company, Wilmington, Del.

[21] Appl. No.: 444,317

[22] Filed: May 18, 1995

Related U.S. Application Data

[63] Continuation of Ser. No. 108,868, Aug. 18, 1993, abandoned.

[30] Foreign Application Priority Data

Aug. 20, 1992 [DE] Germany ............ 42 27 481.8

[51] Int. Cl.⁶ ............... B05D 3/00; C08F 2/50
[52] U.S. Cl. ............ 427/517; 127/554; 127/555; 127/508; 219/121.6; 19/66.1; 250/251
[58] Field of Search ............ 427/554, 553, 427/508, 517; 219/121.6–121.66; 19/66.1, 66.2; 250/251

[56] References Cited

U.S. PATENT DOCUMENTS

| | | | |
|---|---|---|---|
| 3,588,439 | 5/1967 | Heller et al. | 219/121 |
| 3,678,142 | 7/1972 | Dubach | 264/25 |
| 3,850,698 | 11/1974 | Mallozzi et al. | 148/4 |
| 4,041,192 | 8/1977 | Heger et al. | 427/555 |
| 4,868,006 | 9/1989 | Yorkgittis et al. | 427/555 |
| 5,017,423 | 5/1991 | Bossmann et al. | 428/224 |

FOREIGN PATENT DOCUMENTS 2233334  1/1991  United Kingdom.

*Primary Examiner*—Shrive Beck
*Assistant Examiner*—Brian K. Talbot

[57] ABSTRACT

The current invention involves a process for microstructuring surfaces of oriented polymeric substrates using laser radiation having an intensity which is spatially modulated in a predetermined periodic manner. The process is especially useful for microstructuring the surfaces of textile products and films.

1 Claim, 5 Drawing Sheets

PROCESS FOR MICROSTRUCTURING SURFACES OF ORIENTED POLYMERIC SUBSTRATESUSING LASER RADIATION

This is a continuation of application Ser. No. 08/108,868 filed Aug. 18, 1993, now abandoned.

BACKGROUND OF THE INVENTION

1. Field of the Invention

The current invention concerns a process for microstructuring surfaces of oriented polymeric substrates using laser radiation. More specifically, the invention involves a process wherein the laser radiation intensity is spatially modulated in a predetermined periodic manner. The process is especially useful for microstructuring the surfaces of textile products.

2. Description of the Related Art

Synthetic melt-spun polymeric fibers, such as polyamide or polyester fibers, typically have smooth surfaces which give rise to undesirable specular reflection. Fabrics prepared from such fibers are perceived by consumers to have a less desirable appearance than fabrics prepared from natural fibers such as cotton or wool. Cotton and wool have irregular, rough surfaces which do not give rise to specular reflections. Also, consumers tend to prefer the tactile aesthetics of natural fibers over those of melt-spun fibers. The preferred tactile aesthetics of these fibers are also believed to be due to their irregular surface which reduces the contact area with the skin.

Bossman & Schollmeyer, U.S. Pat. No. 5,017,423 and Schollmeyer & Bahners, Melliand Textilber. No. 4:251–6 (1990) disclose forming microstructures on the surfaces of synthetic fibers by exposing the fibers to laser radiation. The microstructured surfaces cause the specular reflection to be broken up, resulting in a fiber appearance closely resembling that of natural fibers such as cotton or wool. Generally in such operations, laser radiation in the ultraviolet region is employed due to strong absorption of the photons in this region by the synthetic polymeric fibers. Excimer-type lasers are commonly used to generate such radiation, but these lasers are generally impractical for long-term industrial use because of the costs associated with short electrode life and window fouling.

It is also known that such polymeric substrates have absorption bands in the infrared (IR) region which coincide with wavelengths emitted by known wavelength-tunable lasers, such as $CO_2$ and CO lasers. However, attempts to use such lasers in accordance with the above-described excimer laser methods in order to microstructure fiber substrates have been unsuccessful. Even as the "fluence" is increased, no microstructuring effect is observed; rather, the fiber eventually melts at a certain fluence level. The term "fluence" denotes the energy in $J/cm^2$ that is delivered to and absorbed by the fibers when a laser pulse is directed towards them.

The current invention provides a reliable, cost-effective process for microstructuring polymeric surfaces using industrially proven lasers including the $CO_2$ and CO infrared lasers, special excimer lasers having a large coherence length, and dye lasers. The process of the current invention requires only about one-tenth the fluence ($J/cm^2$) of that required by conventional methods using standard excimer lasers.

SUMMARY OF THE INVENTION

The current invention is directed to a process for forming microstructures on a surface of an oriented polymeric substrate using laser radiation. Particularly, the invention involves treating the oriented polymeric substrate with radiation having an intensity that is spatially modulated in a predetermined periodic manner. The polymeric substrate absorbs the radiation with an absorbance of at least 1000 $cm^{-1}$ and preferably at least 3000 $cm^{-1}$. Generally, the radiation is applied to the surface in at least one pulse of less than 10 microseconds duration at a fluence per pulse between about 20 $mJ/cm^2$ and 1 $J/cm^2$ and preferably at a fluence per pulse between about 20 $mJ/cm^2$ and 200 $mJ/cm^2$.

The spatially modulated radiation may comprise an interference pattern formed by the interference of two coherent laser beams, wherein the interference pattern is modulated with a period length of about 1 to 10 micrometers. The process is particularly suitable for microstructuring the surfaces of textile products and films, especially nylon or polyester products.

DETAILED DESCRIPTION OF THE INVENTION

Figure 1:
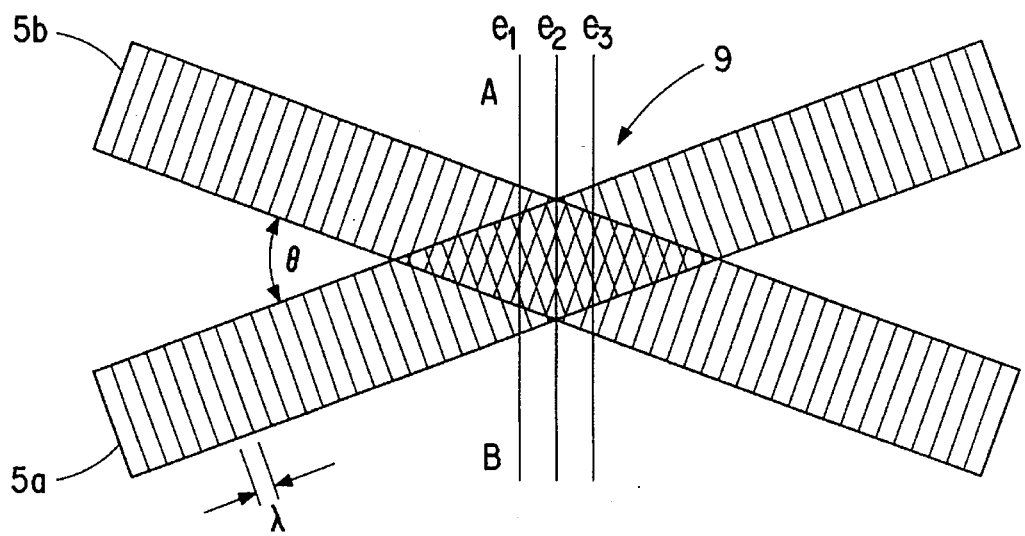
FIG. 1 shows a schematic representation for carrying out the process of the current invention using interfering laser beams.

The current invention involves generating a radiation field having an intensity that is spatially modulated in a predetermined periodic manner and irradiating an oriented polymeric substrate in such a way that the surface of the substrate is "microstructured." By the term "microstructured", it is meant that transverse ridges are formed on the surface of the polymeric substrate. Lasers which generate coherent beams are suitable for use in the current invention, whereas they are not useful in conventional methods. The spatial modulation is imposed on the beam in a predetermined manner rather than relying on random fluctuations as used in conventional methods with excimer lasers.

Suitable substrates include oriented synthetic polymeric "filaments" and yarns or fabrics prepared therefrom. The term "filament" as used herein, includes staple length fibers (0.6 cm to 15 cm long) as well as continuous filaments. Preferred substrates include melt-spun nylon or polyester filaments suitable for use in textile applications including apparel, home furnishings, and carpeting. Oriented films are also suitable. Microstructuring of films is desirable for improved adhesion.

The term "oriented" as used herein, refers to substrates which have a tendency to shrink when heated to the melting point. All commercial textile products and packaging films tested were found to have sufficient orientation to develop microstructures on their surfaces when irradiated. Polyester filament yarns spun at about 1000 m/min with a draw ratio of 1.5X exhibited microstructuring when irradiated in accordance with this invention. Commercial processes for making fully drawn, hard yarns typically use draw ratios of 3.0X and above. Yarns spun at speeds in excess of 5000 m/min have sufficient orientation for microstructuring even if they are not drawn. Some partially oriented yarns (POY) do not have sufficient orientation when first made, but do develop sufficient orientation in texturing. Spandex fibers must be irradiated in stretched form (1.5X or more) to develop microstructures.

When an oriented polymeric substrate, such as a drawn fiber, is irradiated with laser radiation having an intensity that is spatially modulated and that is sufficiently absorbed to melt the surface of the substrate, the resulting melt has alternating regions that are "hotter" than adjacent regions of the melt. It is believed that during drawing of a fiber, for example by a modest 4X, the average polymer molecule becomes four times longer, and to conserve volume, two times thinner in the two transverse directions. This very large reduction in entropy creates a frozen-in stress in the drawn film or fiber. When the surface of the fiber is melted, a large negative pressure is created in the melt. If the temperature is uniform, the molecules slide past each other and assume a more or less spherical shape. This can be seen as a loss of birefringence in approximately the top micrometer of the fiber. However, if there are temperature gradients, then there will be corresponding viscosity gradients. It is believed that because of the entanglement of the polymer molecules, the molecules in the "cooler regions" of the melt will pull molecules in the less viscous "hotter regions" towards the cooler regions thus creating the observed ridged microstructure. The "hills" in the structure correspond to the cooler regions and the "valleys" correspond to the hotter regions on the surface of the fiber.

In a fiber, the tension in the melt is always along the fiber axes, therefore the ridges are almost always perpendicular to the fiber axes even if the varying radiation field is not perpendicular to the fiber axes. In a biaxially oriented film, however, there is no preferred direction and the ridges that form always mirror the external radiation field.

When there are only small stochastic fluctuations in the laser beams, as believed to be the case with excimer lasers, a relatively large number of pulses are needed to develop the transverse ridges on the substrate's surface. However, in accordance with the current invention, if a spatially modulated field is applied in which the peak-to-peak distance of the energy is of the same order of magnitude as the "natural" ridge-to-ridge distance that is observed in fibers irradiated with, e.g., 40 pulses from a conventional excimer laser, then a single pulse of the spatially varying radiation field may suffice to produce the ridge structure.

In the current invention, there is little or no loss of fiber weight, nor are such physical properties as breaking strength, breaking elongation, and modulus affected in a significant way. The only noticeable physical change is that approximately the top micrometer of the fiber surface acquires a wavy structure, as shown in FIGS. 4–7. Most or all of the orientation in this upper one micrometer layer is lost. This layer is initially amorphous immediately after the irradiation, but the polymer crystallizes again either spontaneously or after modest warming and, except for the difference in orientation, is substantially indistinguishable from the rest of the fiber. Since apparel fibers typically have a diameter of about 15 µm, the irradiated material amounts to only a small fraction of the total fiber.

Lasers which are suitable for use in the current invention include infrared lasers such as CO and $CO_2$ lasers which have good cooling systems and which have been modified with diffraction gratings and Q-switches. Particularly, these lasers are equipped with a diffraction grating such that they can be operated at different wavelengths versus those used in a simple mirror system. A Q-switch (a quality switch which refers to the gain possible in the laser medium) is required to produce short pulses. The ability to use these large, reliable infrared gas lasers make the current invention more economically viable in the cost-conscious textile industry. A key difference between CO and $CO_2$ infrared lasers versus conventional excimer lasers is the quality of the laser beam. Excimer lasers exhibit large stochastic spatial and temporal variations in their beams corresponding to the inhomogeneities in the plasma which are particularly pronounced with ArF excimer lasers. $CO_2$ and CO lasers, on the other hand, have near Gaussian beams. However, it has been found that special excimer lasers having a beam with sufficient coherence length to form an interference pattern large enough to treat fibers or fabrics may be used in the process of the current invention. The coherence length of the beam should be at least five (5) millimeters and preferably twenty (20) millimeters. Conventional excimer lasers cannot be used to produce useful interference patterns since their coherence length is only on the order of micrometers. Deeply dyed fabrics can also be microstructured by using lasers emitting photons in the visible region of the spectrum. For example, dye lasers and Ti sapphire lasers have beams with excellent coherence length and produce good interference patterns.

However, in all cases it is essential that the absorbance of the fiber at the applied wavelength exceeds about $1000\ cm^{-1}$ in order that most of the light is absorbed in the surface of the fiber. The laser is chosen such that the radiation emitted therefrom is strongly absorbed by the substrate. Preferably, at least 50% of the radiation is absorbed in the top 3 µm of the surface of the substrate, more preferably in the top 1 µm. This corresponds to an absorbance of at least $1000\ cm^{-1}$, preferably greater than $3000\ cm^{-1}$. Absorbances as low as $500\ cm^{-1}$ have been found to give some degree of microstructuring. By comparison, conventional methods with excimer lasers use absorbances on the order of 8,600 to $230,000\ cm^{-1}$.

For example, an absorption band of polyester at 9.814 µm having an absorbance of approximately $1000\ cm^{-1}$ coincides with the 9P48 line of the $CO_2$ laser. Other absorption bands include the absorption band of polyester at 9.091 µm with an absorbance of about $2000\ cm^{-1}$ which coincides with the 9R46 line of the $CO_2$ laser; the absorption band of polyester at 5.817 µm with an absorbance of about $3000\ cm^{-1}$ which overlaps about eight emission lines of the CO laser; and the nylon 6,6 absorption band at 6.106 µm with an absorbance of about $3000\ cm^{-1}$ which overlaps about five lines of the CO laser.

The substrate should be irradiated with fluences per pulse of about 20 $mJ/cm^2$–1 $J/cm^2$, preferably about 20 $mJ/cm^2$–200 $mJ/cm^2$ delivered to the surface in pulses of less than 10 µsec. In practice, one to eight pulses and preferably two to four pulses are used in the process of this invention to produce transverse ridges on the substrate's surface. In contrast, forty pulses are typically needed to produce the same effect using standard excimer lasers. Higher fluences generally result in complete melting of the substrate which is undesirable. Pulses longer than 10 μsec are ineffective since the heat is conducted into the interior of the fiber as fast as it is delivered to the fiber's surface. As a result, there is general heating of the fiber rather than specific heating of the surface. Pulses lasting no more than a few μsec are preferred; but the pulses may be much shorter, lasting nanoseconds, picoseconds, or even femtoseconds. It is important that an appropriate fluence be delivered to and absorbed by the surface in a time which is shorter than the time it takes for heat to be conducted by the polymer into the interior of the fiber. Generally, the time for the heat to be conducted into the interior of the fiber is in the order of a few microseconds.

A preferred method for generating the spatially modulated radiation field is by splitting a coherent laser beam into two beams and interfering the resulting coherent beams at an angle to produce an interference pattern. FIG. 1 illustrates schematically how to practice the process according to the current invention using interfering beams. Two laser beams $5a$ and $5b$ of wavelength $\lambda$, capable of interference, are superimposed at an angle θ in a region 9 in which the surface to be structured should be arranged parallel to one of the planes $e_i$ (i=1,2,3). In order to employ the process according to the invention most effectively, the surface to be structured should be arranged in a plane between the planes $e_1$ and $e_3$, i.e., at the place where the maximum expanse of the interference field is located.

If the wavelength of the incident radiation is $\lambda$ and the angle between the two interfering beams is θ, the light intensity resulting from the interference of the beams will vary with a spacing between intensity maxima d:

$$d=\lambda/[2 \sin(\theta/2)]$$

As discussed above, irradiation of biaxially stretched films produces a surface microstructure having a hill-to-hill distance of d. In the case of oriented fibers, the hill-to-hill distance depends more on the factors inherent in the fiber such as the chemical nature of the polymer, its molecular weight, and the degree of orientation of the fiber which in turn depends on spinning speed and draw ratio as those skilled in the art will recognize. However, the external radiation field is most effective in microstructuring the fiber surface when the spacing d of the external radiation field corresponds reasonably closely to the "natural" hill-to-hill distance produced when the fiber is irradiated with, e.g, forty pulses from a conventional excimer laser. Since that "natural" spacing is in the range of a few micrometers for most apparel fibers including polyester and nylon 6,6, an interference pattern having a spacing from about one to about ten micrometers, preferably a spacing between about two and about six micrometers, and most preferably about three to five micrometers is most effective. The spacing d of the external field can be adjusted by varying the angle θ. For infrared lasers, typically large angles of interference are used in order to achieve spacings in this range. For example, with $CO_2$ lasers, about 5 μm is the minimum possible spacing, whereas CO lasers can reach the most preferred range of spacings down to about 3 μm.

Figure 2:
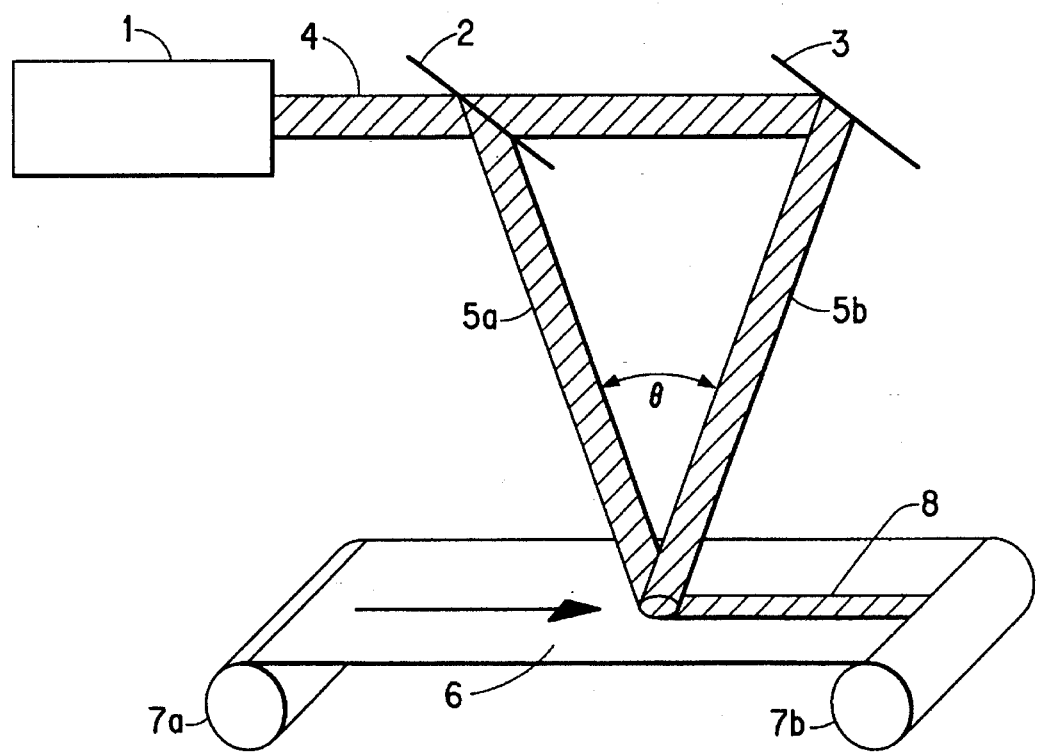
FIG. 2 shows an embodiment for treating sheet-like substrates according to the current invention.

FIG. 2 shows an embodiment of the current invention for treating sheet-like materials. Coherent laser beam 4 produced by a laser 1 is split by a beam splitter 2 into several partial beams, in this case two partial beams, $5a$ and $5b$. By means of a deflecting mirror 3, one partial beam $5b$ is deflected in a plane and crossed with the second partial beam $5a$ at an angle θ. The substrate 6 to be irradiated finds itself in the region of overlap of partial beams $5a$ and $5b$ (irradiation zone 9). Substrate 6 is transported through the laser radiation field, e.g., by means of a suitable transport device $7a$ and $7b$. A long length of a wide material such as a film or a fabric can, e.g., be irradiated one strip at a time, the width of the strip being the width of the interference pattern formed on the sheet-like material. An oscillating deflection of the beam normal to the direction of transport is also possible in which case the oscillation is preferably produced by simultaneously tilting optics 2 and 3, which influence the beams, at an angle normal to the direction of transport. In this embodiment, the entire width of the sheet-like material is irradiated by scanning the interference pattern across it. Thus, the sheet-like material need only be passed under the laser beam once.

The interfered beam leaves a trace 8 on the substrate which exhibits the desired microstructuring. In addition to the dependence on the absorbance, the depth of microstructuring results from: 1) the laser power applied to the substrate 6 and, 2) the duration of the interaction between the substrate 6 and the power-density modulated laser radiation field. While the first above aspect concerns the choice of a suitable laser and the adjustment of the laser parameters, the duration of interaction with the laser radiation field can be adjusted in a suitable manner by varying the speed of transport. In turn, the speed of transport determines the number of pulses of the interfering laser beams received by the sheet-like material.

Figure 3:
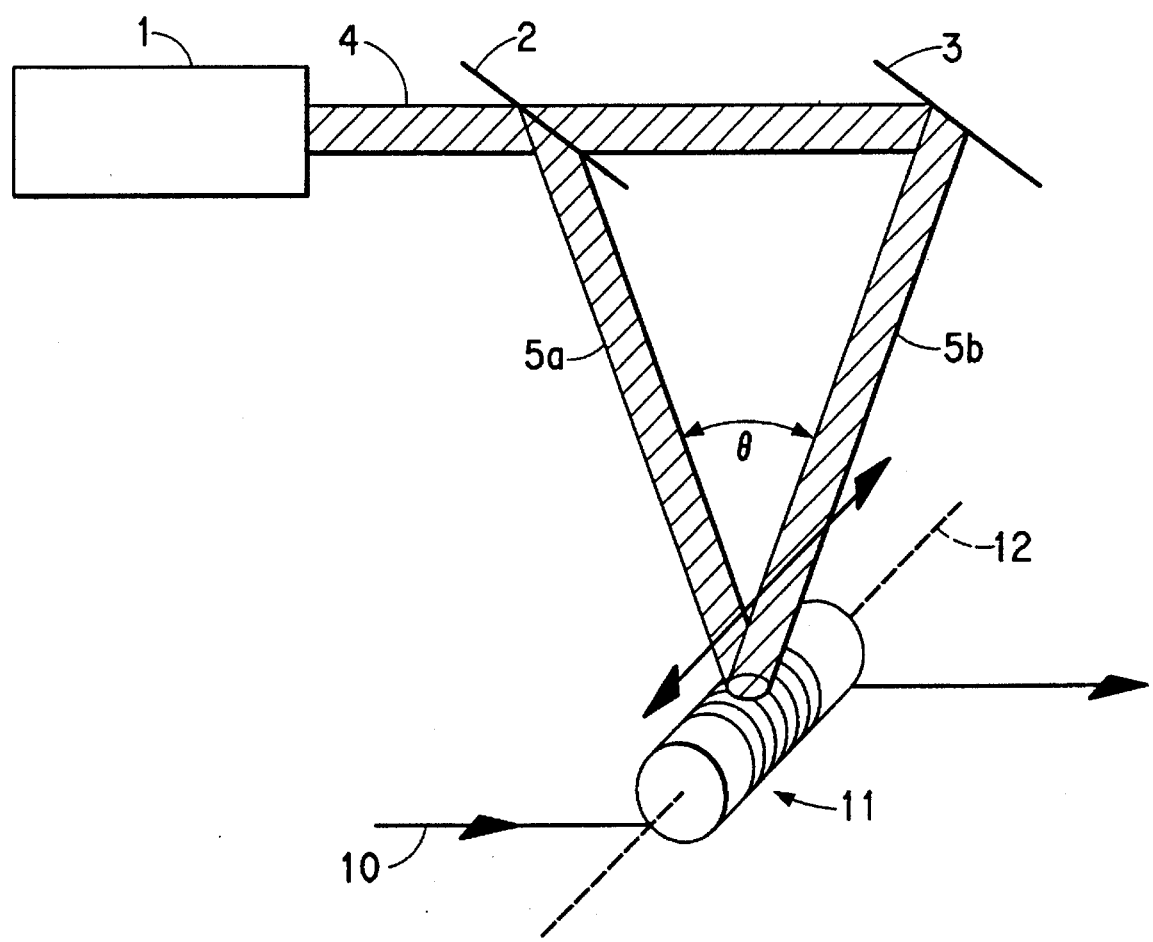
FIG. 3 shows an embodiment for treating filaments and yarns according to the current invention.

Other arrangements, in addition to the arrangement illustrated and described in FIG. 2, are possible, as long as it is assured that the surface to be structured finds itself in the region of the irradiation zone. For example, FIG. 3 shows an embodiment for treating filaments or yarns. Individual filament or yarns 10 are passed over a rotating cylinder 11, wherein the filament or yarns are wrapped several times around the surface of the cylinder and the laser beams $5a$ and $5b$ oscillate in parallel to the cylinder axis 12. As the cylinder rotates, the filament or yarn is wound up in the region of one base plane of the cylinder and unwound in the region of the opposite base plane of the cylinder.

A key advantage of the current invention is that microstructured surfaces may be produced using only about one-tenth the fluence level ($J/cm^2$) of that used in conventional processes using standard excimer lasers. The energy to be expended in accordance with the process of this invention amounts to only a fraction of the energy required in a microstructuring treatment with an ArF-excimer laser at $\lambda=193$ nm, i.e., a single shot of 100 $mJ/cm^2$ may be used instead of 20 shots of 60 $mJ/cm^2$ each. At the fluence levels used in this invention, the risk of damaging the material to be treated is reduced.

The current invention is further illustrated by the following examples, but these examples should not be construed as limiting the scope of the invention.

EXAMPLES

Example I

Figure 4:
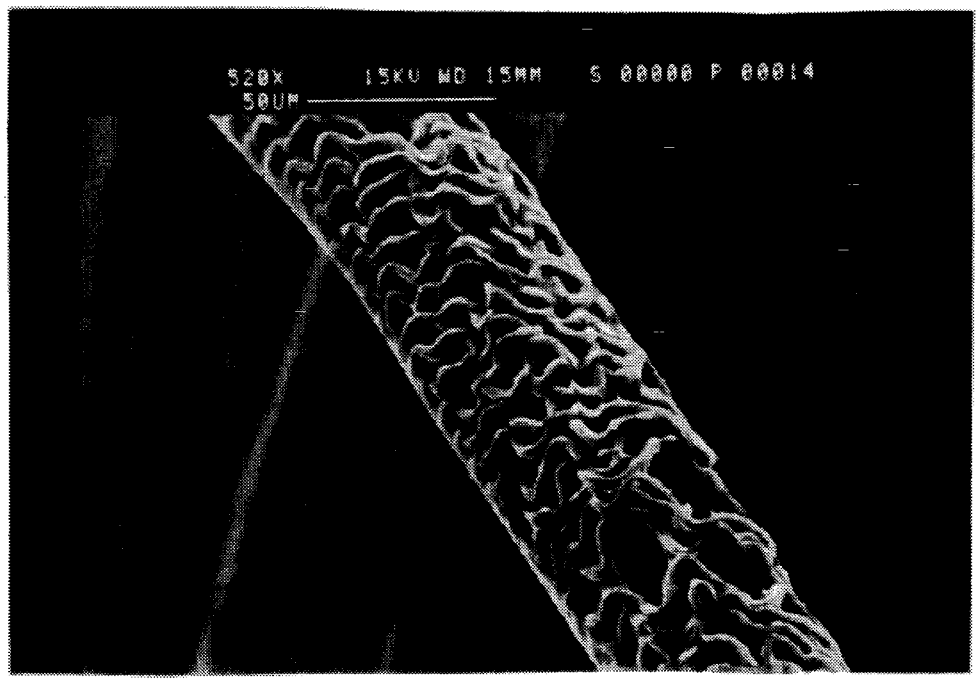
FIG. 4 is a photomicrograph of DACRON polyester carpet fibers microstructured by the process according to the invention using a $CO_2$ laser tuned to the 9P48 line.
Figure 4A:
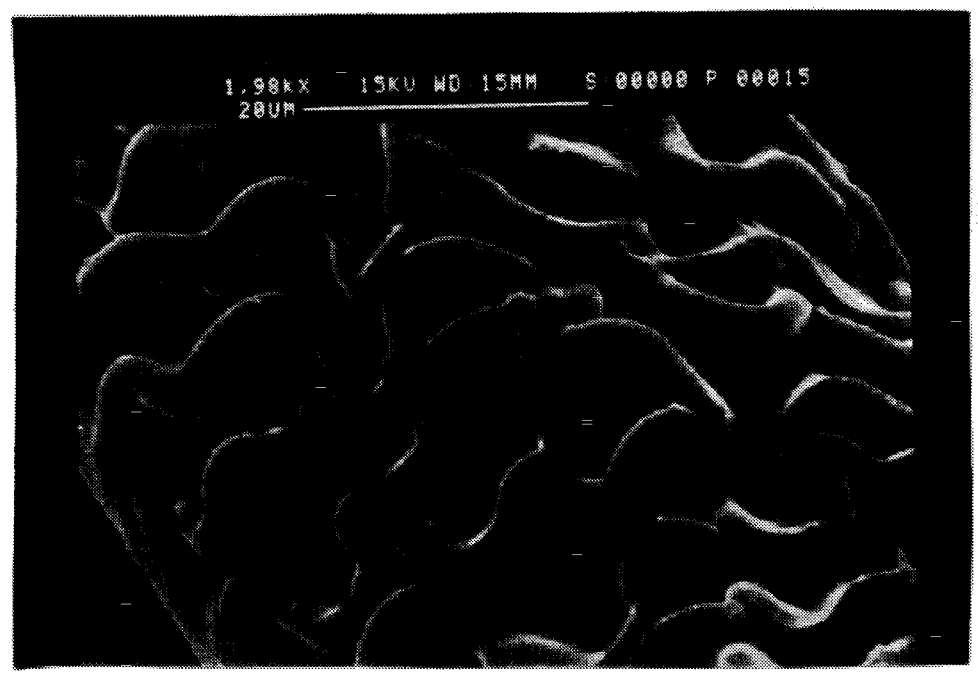
FIG. 4A is an enlarged representation of the DACRON polyester fibers in FIG. 4.

This example illustrates microstructuring of surfaces of polyester carpet fibers using a TEA $CO_2$ infrared laser. The laser (URANIT, model ML204) was tuned to the 9P48 line (wavelength 9.817 μm) with a grating which replaced the normal rear mirror. The wavelength of the 9P48 line corresponded closely to the absorption peak of polyester at 9.814 μm. The beam was split by a beam splitter and the resultant two beams were recombined using mirrors positioned such that the two beams formed an angle of 136 degrees. This produced an interference pattern with a peak-to-peak spacing of 5.3 μm. A short section of melt-spun DACRON bulked continuous filament (BCF) polyester carpet yarn (68 filaments, 17 dtex/filament) was taped across a hole in a metal coupon. The coupon was placed such that the yarn spanning the hole was located in the interference field. The yarn was irradiated with a single 200 mJ/cm$^2$ pulse of the interference pattern (absorbance about 1000 cm$^{-1}$) with a pulse duration of approximately 600 nanoseconds. FIGS. 4 and 4A are photomicrographs of DACRON fibers subjected to this process.

Example II

Figure 5:
FIG. 5 is a photomicrograph of SONTARA polyester filaments microstructured by the process according to the invention using a KrF excimer laser.
Figure 5A:
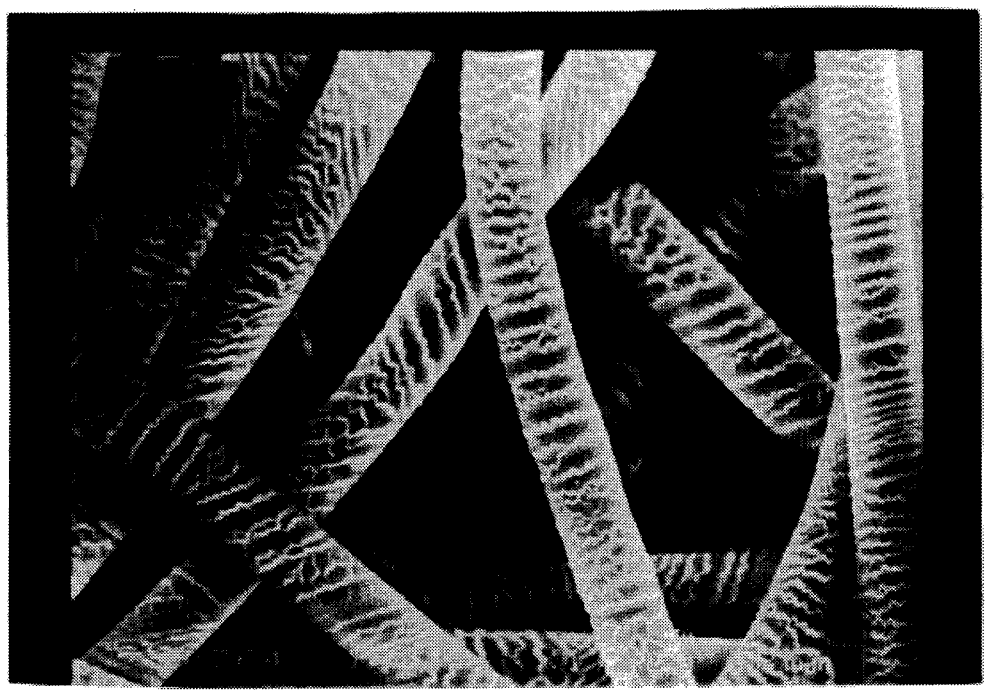
FIG. 5A is an enlarged representation of the SONTARA polyester fibers in FIG. 5.

This example illustrates irradiation of SONTARA polyester spunlaced fabrics with an interference pattern using a KrF excimer laser having a coherence length of several mm. The laser beam, having a wavelength of 248 nm, was split and recombined at an angle of 4.7 degrees to produce an interference pattern having a peak-to-peak spacing of 3.0 μm. SONTARA polyester fabric Style Number 8001, basis weight 0.95 oz/yd$^2$ (manufactured by E. I. du Pont de Nemours and Company, Wilmington, Del.) was irradiated with eight pulses, each having a fluence of 100 mJ/cm$^2$ (absorbance about 150,000 cm$^{-1}$) and a pulse duration of 20 nanoseconds. A short section of the fabric was taped across a hole in a metal coupon in a manner similar to Example I. FIGS. 5 and 5A are photomicrographs of SONTARA fibers subjected to this process. The transverse ridges formed on the fibers are approximately perpendicular to the fiber axes, regardless of the orientation of the fiber axes. Examination of fiber samples exposed to different numbers of pulses showed that the ridges appear on the fibers after the first pulse of the interference pattern and are fully developed after 4–8 pulses. Interference patterns having a fluence as low as 30 mJ/cm$^2$ rapidly develop the desired ridge structure on the fibers. By comparison, processes of the prior art which use standard excimer lasers require about 5–10 times higher total fluence, obtained by using more pulses and/or higher fluence per pulse. These processes produce only a finely speckled surface after the initial pulse and it typically takes ten or more pulses before the desired ridge structure is formed.

Example III

Figure 6:
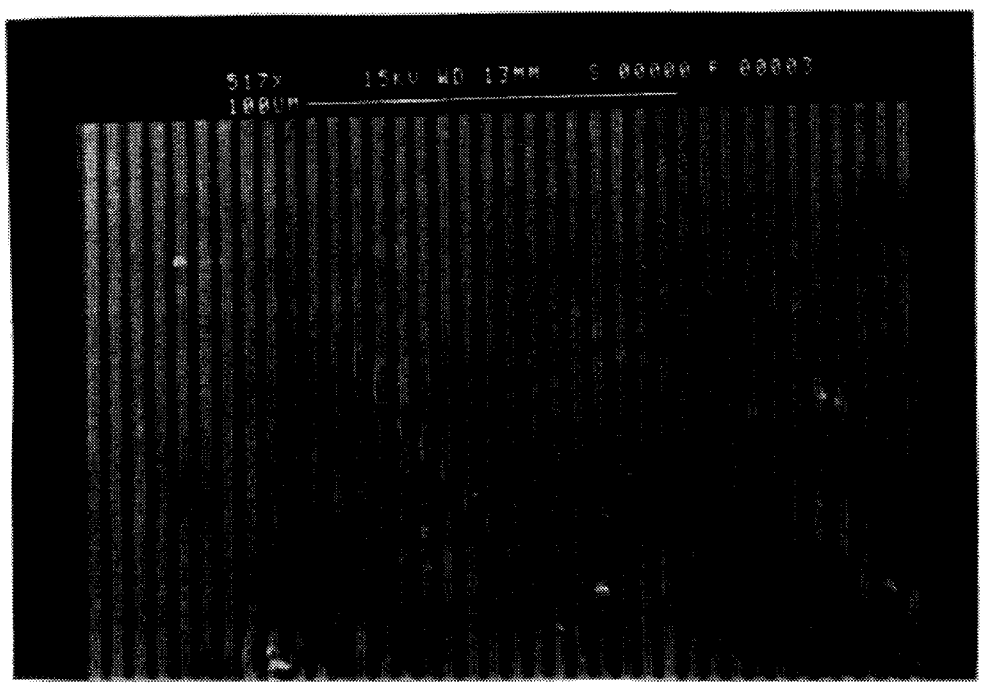
FIG. 6 is a photomicrograph of a MYLAR polyester film microstructured by the process according to the invention using a $CO_2$ laser tuned to the 9P48 line.

This example illustrates microstructuring of oriented polyester films by irradiation with a $CO_2$ infrared laser. Samples of MYLAR polyester film, (manufactured by E. I. du Pont de Nemours and Company, Wilmington, Del.) were irradiated with a single 200 mJ/cm$^2$ pulse of an interference pattern from $CO_2$ 9P48 radiation, which was produced in a manner similar to that described in Example I, with a pulse duration of approximately 600 nanoseconds. The angle of interference was varied between 136 degrees and 9 degrees, corresponding to spacings between intensity maxima of 5.3, 17, 35, and 64 μm and theoretical hill-dale spacings of 2.65, 8.5, 17.5, and 32 μm, respectively. Actual hill-dale spacings agree with the predicted values within experimental accuracy. FIG. 6 is a photomicrograph of the MYLAR polyester film irradiated with $CO_2$ 9P48 radiation at an angle of interference of 136 degrees.

Example IV

Figure 7:
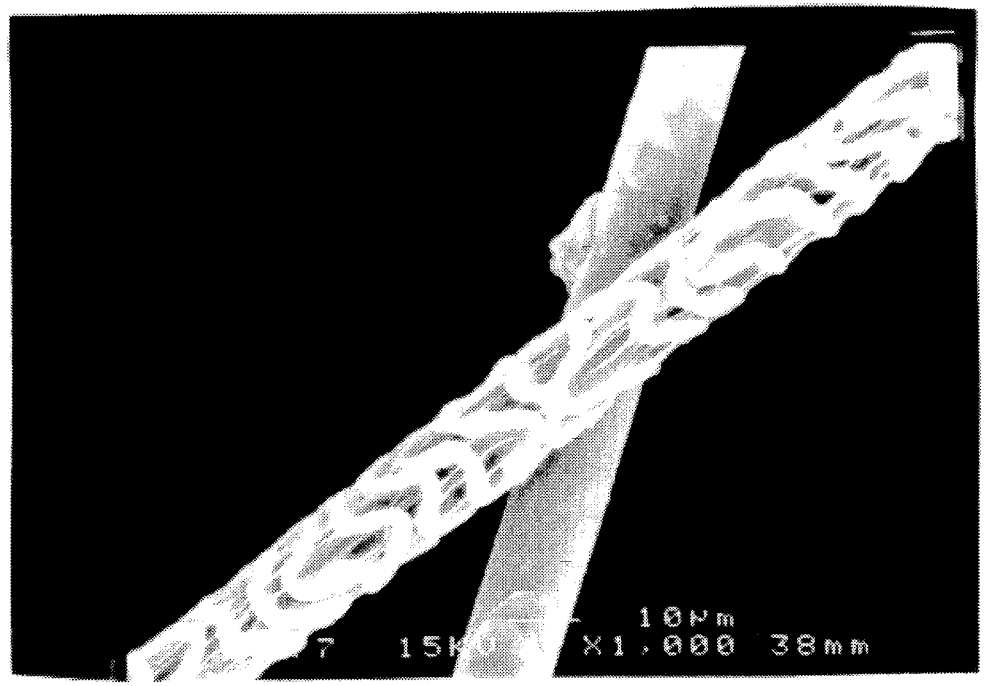
FIG. 7 is a photomicrograph of DACRON polyester textile fibers microstructured by the process according to the invention using a $CO_2$ laser tuned to the 9P48 line.

This example illustrates microstructuring surfaces of DACRON polyester textile fibers using a TEZ $CO_2$ infrared laser. The laser, (URANIT, model ML204) was tuned to the 9P48 line (wavelength 9.817 μm) and equipped with a grating which replaced the normal rear mirror. The beam was split by a beam splitter and the resultant two beams were recombined using mirrors positioned such that the two beams formed an angle of 86 degrees. This produced an interference pattern with a peak-to-peak spacing of 7.2 μm. A short section of melt-spun DACRON polyester textile yarn, (2.5 dtex/filament) was taped across a hole in a metal coupon. The coupon was placed such that the yarn spanning the hole was located in the interference field. The yarn was irradiated with a fluence of 121 mJ/cm$^2$ using 1 pulse of the interference pattern (absorbance about 1000 cm$^{-1}$) with a pulse duration of approximately 600 nanoseconds. FIG. 7 is a photomicrograph of DACRON fibers subjected to this process.

We claim:

1. A process for forming a wavy microstructure on the surface of an oriented polymeric substrate comprising irradiating the surface of an oriented polymeric substrate with pulses of radiation with a fluence per pulse of about 20 mJ/cm$_2$ to 200 mJ/cm$_2$ in a laser beam interference pattern having a spacing from about one to about ten micrometers from a laser beam having a coherence length of at least five millimeters that has been tuned with a diffraction grating to a wavelength where the oriented polymeric substrate absorbs the radiation with an absorbance of at least 1000 cm$^{-1}$ and that has been split into two coherent beams and the coherent beams combined at an angle to produce said interference pattern wherein, the oriented polymeric substrate absorbs the radiation with an absorbance of at least 1000 cm$^{-1}$, thereby melting the surface of the oriented polymeric substrate exposed to the interference pattern to a depth of approximately one micrometer with little or no loss of weight of the substrate and forming a layer having a wavy microstructure and a loss of orientation.

* * * * *